(12) United States Patent
Lin et al.

(10) Patent No.: US 10,530,570 B2
(45) Date of Patent: Jan. 7, 2020

(54) TRANSMISSION APPARATUS, AND TRANSMISSION DATA PROTECTION METHOD THEREOF

(71) Applicant: Institute For Information Industry, Taipei (TW)

(72) Inventors: Chih-Ta Lin, Taipei (TW); Chuan-Kai Kao, Kaohsiung (TW)

(73) Assignee: Institute For Information Industry, Taipei (TW)

( * ) Notice: Subject to any disclaimer, the term of this patent is extended or adjusted under 35 U.S.C. 154(b) by 131 days.

(21) Appl. No.: 15/791,379

(22) Filed: Oct. 23, 2017

(65) Prior Publication Data

US 2019/0044701 A1 Feb. 7, 2019

(30) Foreign Application Priority Data

Aug. 4, 2017 (TW) .............................. 106126380 A

(51) Int. Cl.
*H04L 29/06* (2006.01)
*H04L 9/06* (2006.01)
(Continued)

(52) U.S. Cl.
CPC .......... *H04L 9/0643* (2013.01); *G06F 21/602* (2013.01); *H04L 9/3239* (2013.01);
(Continued)

(58) Field of Classification Search
CPC .................................. H04L 12/00; G06F 9/00
See application file for complete search history.

(56) References Cited

U.S. PATENT DOCUMENTS 8,850,583 B1 * 9/2014 Nelson ................ H04L 63/1433
380/44
9,043,517 B1 * 5/2015 Sprouse .............. G06F 12/0246
707/999.002

(Continued)

OTHER PUBLICATIONS

Úlfar Erlingsson, Vasyl Pihur, Aleksandra Korolova, RAPPOR: Randomized Aggregatable Privacy—Preserving Ordinal Response, CCS '14 Proceedings of the 2014 ACM SIGSAC Conference on Computer and Communications Security, Nov. 3-7, 2014, 14 pages.
(Continued)

*Primary Examiner* — Joseph P Hirl
*Assistant Examiner* — Leynna Truvan
(74) *Attorney, Agent, or Firm* — Skaar Ulbrich Macari, P.A.

(57) ABSTRACT

A transmission apparatus and a transmission data protection method thereof are provided. The transmission apparatus stores a data table, a bloom filter, a first randomization array, a plurality of second randomization arrays and an identifier of each of the second randomization arrays. The bloom filter has a plurality of independent hash functions. The transmission apparatus generates a current original datum according to the data table; inputs the current original datum to the bloom filter as a current input datum of the bloom filter to output a current bloom datum; randomizes the current bloom datum according to the first randomization array to generate a current first randomized datum; randomizes the current first randomized datum according to one of the second randomization arrays to generate a current second randomized datum; and transmits a data signal carrying the current second randomized datum and an identification datum to another transmission apparatus.

17 Claims, 8 Drawing Sheets

(51) Int. Cl.
*G06F 21/60* (2013.01)
*H04L 9/32* (2006.01)

(52) U.S. Cl.
CPC .... *H04L 2209/08* (2013.01); *H04L 2209/805* (2013.01); *H04L 2209/84* (2013.01)

(56) References Cited

OTHER PUBLICATIONS

Giulia Fanti, Vasyl Pihur, Úlfar Erlingsson, Building a RAPPOR with the Unknown: Privacy-Preserving Learning of Associations and Data Dictionaries, arXiv:1503.01214v1, Mar. 4, 2015, 17 pages.

* cited by examiner

TRANSMISSION APPARATUS, AND TRANSMISSION DATA PROTECTION METHOD THEREOF

PRIORITY

This application claims priority to Taiwan Patent Application No. 106126380 filed on Aug. 4, 2017, which is hereby incorporated by reference in its entirety.

FIELD

The present invention relates to a transmission apparatus and a transmission data protection method thereof. Particularly, the transmission apparatus of the present invention achieves secure processing on original data through operation minimization.

BACKGROUND

With the rapid development of wireless communication technology in recent years, various wireless communication products are ubiquitous in people's daily life in order to meet various communication requirements and applications. To ensure the security of data that is about to be transmitted, the data will be first encrypted, e.g., through Data Encryption Standard (DES) algorithm or Advanced Encryption Standard (AES) algorithm, before being transmitted. However, in some environments requiring low latency communication, the apparatus at the receiving end not only needs to receive the data timely but also needs to decode the received data rapidly so that the user or the automated apparatus can make a response in time. For example, emergency information that needs to be transmitted in Internet of Vehicles (e.g., danger warnings, crossroad warnings, directions guidance or the like) has timeliness, and traffic accidents cannot be effectively avoided if the emergency information cannot be obtained by the apparatus at the receiving end timely due to the encryption and decryption operations.

Accordingly, an urgent need exists in the art to provide a transmission data protection mechanism, which reduces the time required to perform secure processing on the data to be transmitted and the time required to recover the data received so that the real-time information can be obtained by the apparatus at the receiving end timely.

SUMMARY

An objective of the present invention is to provide a transmission data protection mechanism. For input data in a limited input space or relatively fixed, the transmission data protection mechanism can generate one-to-one corresponding output data by using a bloom filter, and achieves the purpose of securely processing the original data through two stages of data randomization procedures so that the apparatus at the receiving end can completely recover the received data into the original data. In this way, the transmission data protection mechanism of the present invention can effectively reduce the time required to perform secure processing on the data to be transmitted and the time required to recover the data received so that the timeliness information can be obtained by the apparatus at the receiving end timely.

The disclosure includes a transmission apparatus which comprises a storage, a communication interface and a processor. The storage is configured to store a data table, a bloom filter, a first randomization array, a plurality of second randomization arrays and an identifier of each of the second randomization arrays. The bloom filter has a plurality of independent hash functions. The processor is electrically connected to the storage and the communication interface, and is configured to execute the following operations: generating a current original datum according to the data table; inputting the current original datum to the bloom filter as a current input datum of the bloom filter to output a current bloom datum; randomizing the current bloom datum by setting a plurality of first partial bits of the current bloom datum to be 1, setting a plurality of second partial bits of the current bloom datum to be 0 and keeping a plurality of remaining partial bits of the current bloom datum unchanged according to the first randomization array to generate a current first randomized datum; randomly choosing one of the second randomization arrays and randomize the current first randomized datum by inverting a plurality of partial bits in the current first randomized datum according to the chosen second randomization array to generate a current second randomized datum; and transmitting a data signal carrying the current second randomized datum and an identification datum to another transmission apparatus via the communication interface, the identification datum corresponding to the identifier of the chosen second randomization array.

Moreover, the disclosure includes a transmission data protection method for a transmission apparatus. The transmission apparatus comprises a storage, a communication interface and a processor. The storage is configured to store a data table, a bloom filter, a first randomization array, a plurality of second randomization arrays and an identifier of each of the second randomization arrays. The bloom filter has a plurality of independent hash functions. The transmission data protection method is executed by the processor and comprising the following steps of: generating a current original datum according to the data table; inputting the current original datum to the bloom filter as a current input datum of the bloom filter to output a current bloom datum; randomizing the current bloom datum by setting a plurality of first partial bits of the current bloom datum to be 1, setting a plurality of second partial bits of the current bloom datum to be 0 and keeping a plurality of remaining partial bits of the current bloom datum unchanged according to the first randomization array to generate a current first randomized datum; randomly choosing one of the second randomization arrays and randomizing the current first randomized datum by inverting a plurality of partial bits in the current first randomized datum according to the chosen second randomization array to generate a current second randomized datum; and transmitting a data signal carrying the current second randomized datum and an identification datum to another transmission apparatus via the communication interface, the identification datum corresponding to the identifier of the chosen second randomization array.

Furthermore, the disclosure includes a transmission apparatus, which comprises a storage, a communication interface and a processor. The storage is configured to store a data table, an input/output table of a bloom filter, a first randomization array, a plurality of second randomization arrays and an identifier of each of the second randomization arrays. The input/output table records a plurality of original data generated based on the data table, a plurality of bloom data outputted by the bloom filter, and a one-to-one correspondence relationship between the original data and the bloom data. The processor is electrically connected to the storage and the communication interface and is configured to execute the following operations: receiving a data signal from another transmission apparatus via the communication interface, the data signal carrying a current second randomized datum and an identification datum; obtaining the identifier of one of the second randomization arrays according to the identification datum; inverting a plurality of partial bits of the current second randomized datum according to the second randomization array corresponding to the obtained identifier to recover a current first randomized datum; comparing the current first randomized datum with the bloom data according to the first randomization array to obtain a current bloom datum, wherein the current first randomized datum is generated through randomizing the current bloom data by setting a plurality of first partial bits of the current bloom data to be 1, a plurality of second partial bits of the current bloom data to be 0 and keeping a plurality of remaining partial bits of the current bloom data unchanged according to the first randomization array; and obtaining the current original datum corresponding to the current bloom datum according to the input/output table of the bloom filter.

The detailed technology and preferred embodiments implemented for the subject invention are described in the following paragraphs accompanying the appended drawings for people skilled in this field to well appreciate the features of the claimed invention.

DETAILED DESCRIPTION

In the following description, the present invention will be explained with reference to example embodiments thereof; however, these example embodiments are not intended to limit the invention to any particular expel, embodiment, environment, applications or implementations described in these example embodiments. Therefore, description of these example embodiments is only for purpose of illustration rather than to limit the present invention.

It shall be appreciated that, in the following embodiments and the attached drawings, elements unrelated to the present invention are omitted from depiction; and dimensional relationships among individual elements in the attached drawings are illustrated only for ease of understanding, but not to limit the actual scale.

Figure 1:
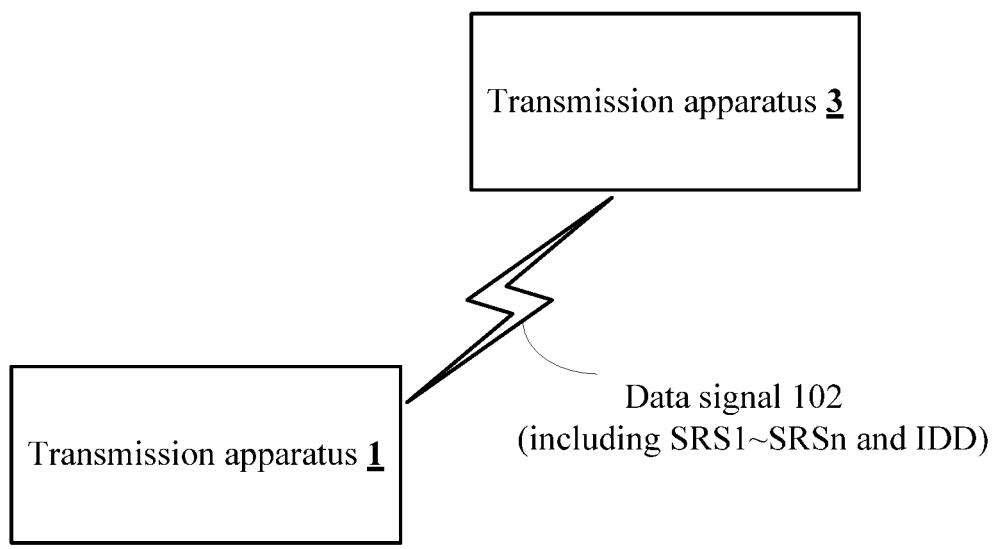
FIG. 1 is a schematic view depicting data transmission between a transmission apparatus 1 and a transmission apparatus 3 according to the present invention.
Figure 2A:
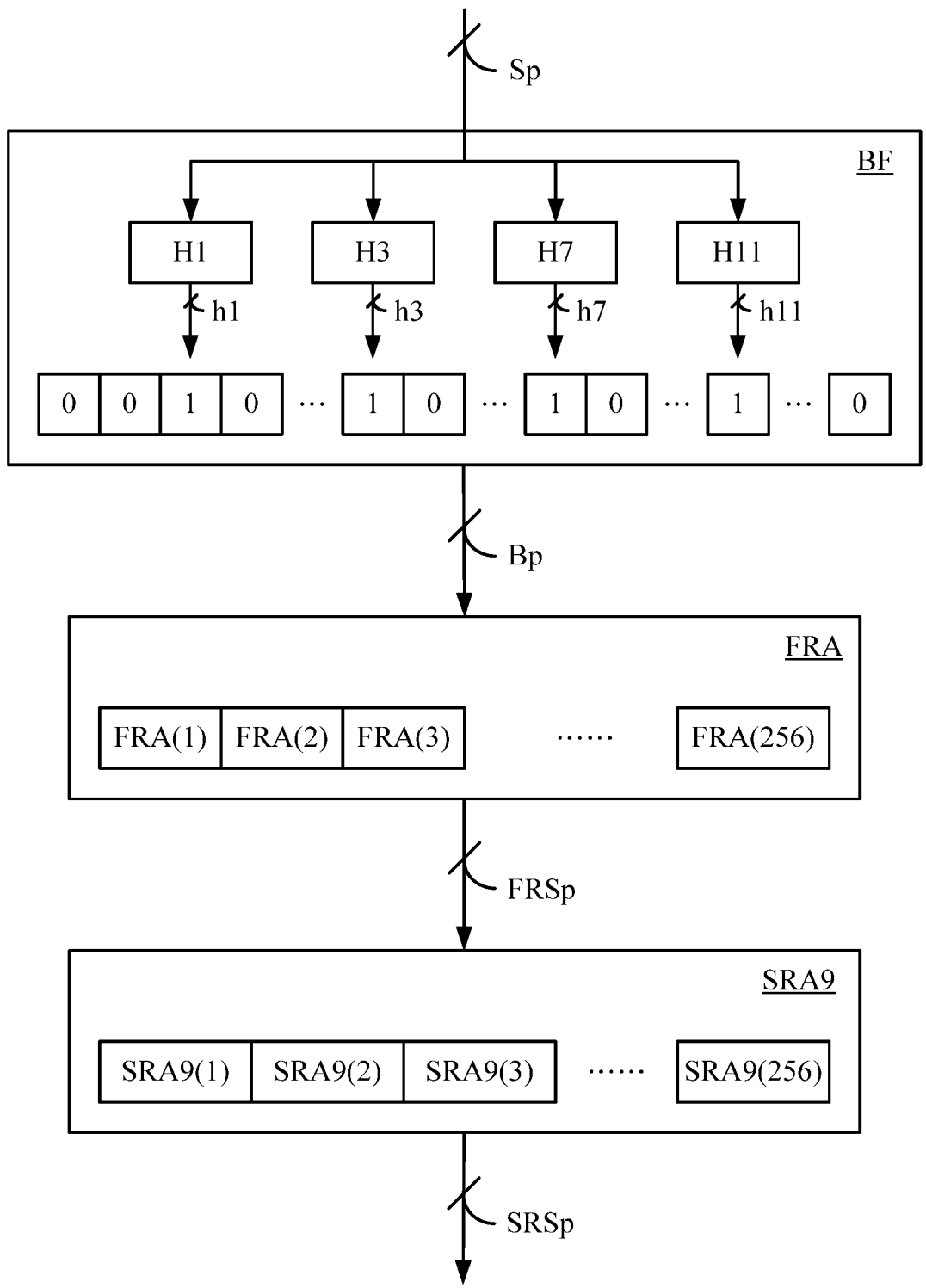
FIG. 2A is a schematic view depicting the transmission apparatus 1 performing data processing.
Figure 2B:
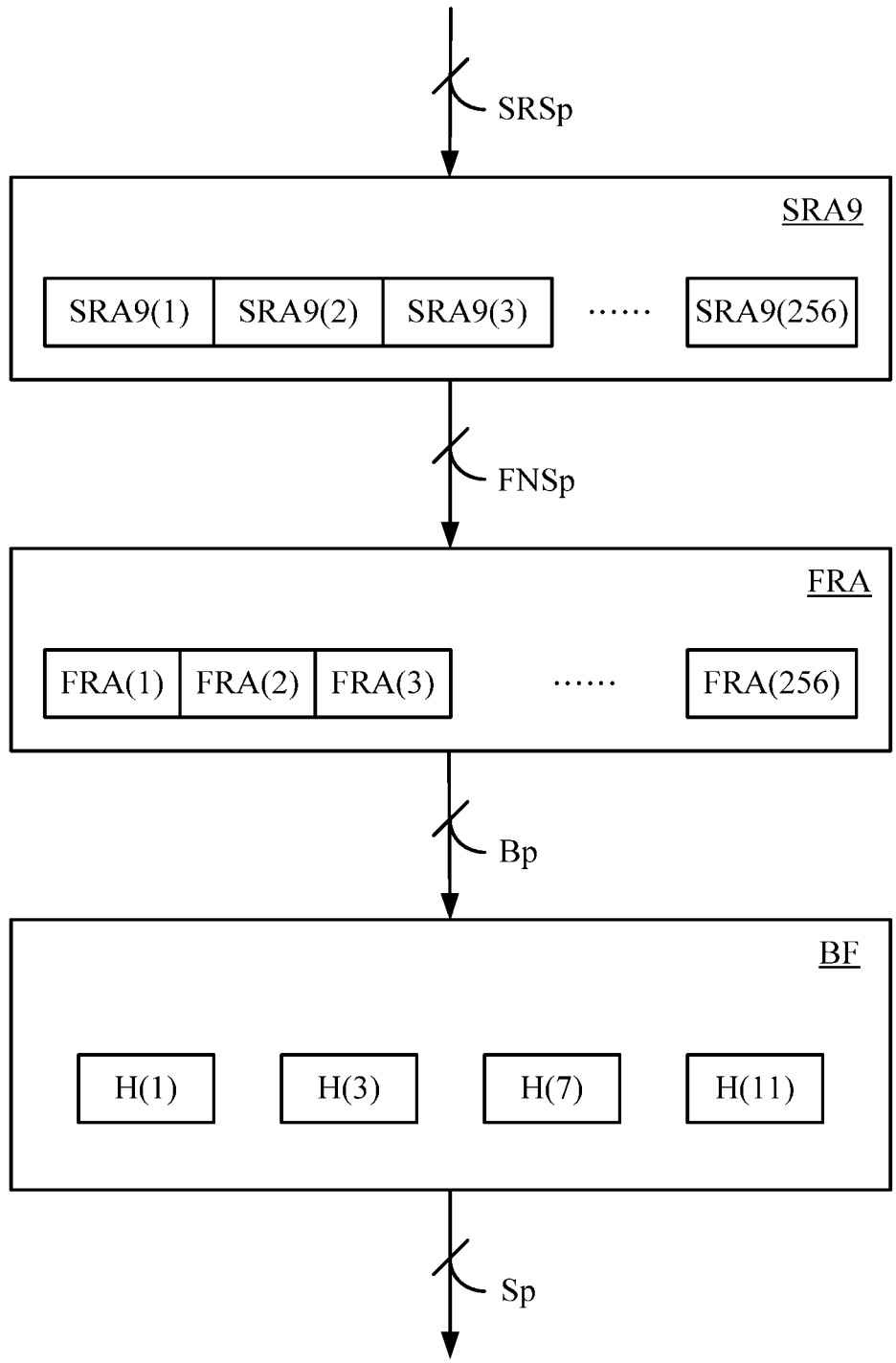
FIG. 2B is a schematic view depicting the transmission apparatus 3 performing data recovering.

A first embodiment of the present invention is as shown in FIG. 1 and FIG. 2. FIG. 1 depicts data transmission between the transmission apparatus 1 and the transmission apparatus 3. FIG. 2A is a schematic view depicting the transmission apparatus 1 performing data processing, and FIG. 2B is a schematic view depicting the transmission apparatus 3 performing data recovering. The transmission apparatus 1 and the transmission apparatus 3 may be a server, a base station, a user equipment (UE) or any apparatus capable of generating and transmitting data. In this embodiment, it is assumed that the transmission apparatus 1 is a base station and the transmission apparatus 3 is a UE mounted on a vehicle.

The transmission apparatus 1 is used to transmit various kinds of information (especially real-time information) to the transmission apparatus 3 according to road conditions at a place where the transmission apparatus 3 is located currently. For example, the real-time information may be emergency information (e.g., danger warnings, crossroad warnings), direction guidance (e.g., guidance for left turning or right turning) or operation commands (e.g., commands for stopping, right turning or left turning) or the like, but it is not limited thereto. The transmission apparatus 1 stores a data table DT, a bloom filter BF, a first randomization array FRA, a plurality of second randomization arrays SRA1 to SRAm (m is a positive integer, e.g., 10) and identifiers ID1 to IDm of each of the second randomization arrays SRA1 to SRAm. The data table DT is configured to generate a plurality of original data S1 to Sn (n is a positive integer, e.g., 30) respectively corresponding to the aforesaid various kinds of real-time information.

It shall be appreciated that, the data table DT of the present invention is used to generate original data S1 to Sn in a limited input space. In other words, the data table DT is used to record data contents (e.g., in a binary form) corresponding to various kinds of information. Therefore, the transmission apparatus 1 can generate a current original datum Sp based on the data table DT according to road conditions of the place where the transmission apparatus 3 is located currently.

In order to ensure the security of the current original datum Sp and prevent the current original data Sp from being intercepted, manipulated or forged for transmission, the transmission apparatus 1 further performs data processing on the current original datum Sp, as shown in FIG. 2A. First, the transmission apparatus 1 inputs the current original datum Sp to the bloom filter BF as a current input datum of the bloom filter BF to output a current bloom datum Bp.

For example, the bloom filter BF has four independent hash functions H1, H3, H7 and H11 to generate the current bloom datum Bp with 256 bits. In other words, the current original datum Sp is inputted into the bloom filter BF to generate hash values hl, h3, h7 and h11 respectively through the four independent hash functions H1, H3, H7 and H11 of the bloom filter BF in the present invention. Then, in the present invention, the four hash values hl, h3, h7 and h11 (e.g., the hash value hl is 3, the hash value h3 is 89, the hash value h7 is 176 and the hash value h11 is 211) are made correspond to the $3^{rd}$, $89^{th}$, $176^{th}$ and $211^{th}$ bits in the datum with 256 bits having an initial value of 0, and these four bits are set to be 1 while other remaining bits are kept as 0 to generate the current bloom datum Bp. The operation of the bloom filter BF of the present invention shall be appreciated by those of ordinary skill in the art based on the above descriptions, and thus will not be further described herein.

After the current bloom datum Bp is generated, the transmission apparatus 1 randomizes the current bloom datum Bp by setting a plurality of first partial bits of the current bloom datum Bp to be 1, setting a plurality of second partial bits of the current bloom datum Bp to be 0 and keeping a plurality of remaining partial bits of the current bloom datum Bp unchanged according to the first randomization array FRA to generate a current first randomized datum FRSp. For example, the first randomization array FRA has 256 fields FRA(1) to FRA(256) which respectively correspond to 256 bits in one-to-one correspondence. The value of each of the fields FRA(1) to FRA(256) represents whether the corresponding bit of the current bloom datum Bp needs to be set to be 1, 0 or kept unchanged. It is assumed that the value of the field FRA(i) being 1 means that the $i^{th}$ bit of the current bloom datum Bp will be set to be 1, the value of the field FRA(i) being 0 means that the $i^{th}$ bit of the current bloom datum Bp will be set to be 0, and the value of the field FRA(i) being x means that the $i^{th}$ bit of the current bloom datum Bp will keep unchanged, wherein i=1~256.

Next, the transmission apparatus 1 randomly chooses one of the second randomization arrays SRA1 to SRAm and randomizes the current first randomized datum FRSp by inverting a plurality of partial bits in the current first randomized datum FRSp according to the chosen second randomization array (e.g., SRA9) to generate a current second randomized datum SRSp. For example, each of the second randomization arrays SRA1 to SRAm has 256 fields which respectively correspond to 256 bits in one-to-one correspondence. Taking the second randomized array SRA9 as an example, the value of each of the fields SRA9(1) to SRA9(256) represents whether the corresponding bit of the current first randomized datum FRSp needs to be inverted. It is assumed that the value of the field SRA9(i) being 1 means that the $i^{th}$ bit of the current first randomized datum FRSp needs to be inverted, and the value of the field SRA9(i) being 0 means that the $i^{th}$ bit of the current first randomized datum FRSp will not be inverted (i.e., keep unchanged), wherein i=1~256.

It shall be appreciated that, the transmission apparatus 1 may directly performs an XOR operation on the current first randomized datum FRSp and the second randomization array SRA9 to obtain the current second randomized datum SRSp in an actual operation. Finally, the transmission apparatus 1 packages the current second randomized datum SRSp and an identification datum IDD into a data signal 102 and transmits the data signal 102 to the transmission apparatus 3. In other words, the data signal 102 carries the current second randomized datum SRSp and the identification datum IDD. The identification datum IDD corresponds to an identifier ID9 of the chosen second randomization array SRA9. Further speaking, the identification datum IDD may record the identifier ID9 of the chosen second randomization array SRA9 in a plaintext form, or may be generated by calculating the identifier ID9 of the chosen second randomization array SRA9 with a hash function.

The transmission apparatus 3 stores the data table DT, an input/output table of the bloom filter BT, the first randomization array FRA, the plurality of second randomization arrays SRA1 to SRAm and identifiers ID1 to IDm of each of the second randomization arrays SRA1 to SRAm. The input/output table of the bloom filter BF records a plurality of original data S1 to Sn generated based on the data table DT, a plurality of bloom data B1 to Bn outputted by the bloom filter BF, and a one-to-one correspondence relationship between the original data S1 to Sn and the bloom data B1 to Bn.

After receiving the data signal 102 from the transmission apparatus 1, the transmission apparatus 3 obtains the identifier of one of the second randomization arrays SRA1 to SRAm (i.e., the identifier ID9 of the second randomized array SRA9 in this case) according to the identification datum IDD. Next, the transmission apparatus 3 inverts a plurality of partial bits of the current second randomized datum SRSp according to the second randomization array SRA9 corresponding to the obtained identifier ID9 to recover the current first randomized datum FRSp. Similarly, the transmission apparatus 3 may directly performs an XOR operation on the current second randomized datum SRSp and the second randomized array SRA9 to recover the current first randomized datum FRSp in an actual operation.

Thereafter, the transmission apparatus 3 compares the current first randomized datum FRSp with the bloom data B1 to Bn according to the first randomization array FRA to obtain the current bloom datum Bp. For example, the transmission apparatus 3 may compare the current first randomized datum FRSp with the bloom data B1 to Bn according to the bits corresponding to the field FRA(i) having a value of x (i.e., bits unchanged by the first randomization array FRA) in first randomization array FRA to obtain a plurality of current candidate bloom data. Next, the transmission apparatus 3 may randomize the current candidate bloom data with the first randomization array FRA to generate a plurality of current candidate first randomized data. Accordingly, the transmission apparatus 3 may obtain the current bloom datum Bp from the current candidate bloom data by comparing the current first randomized datum FRSp with the current candidate first randomized data.

For another example, the transmission apparatus 3 may also store a randomization mapping table of the first randomization array FRA. The randomization mapping table records the bloom data B1 to Bn outputted from the bloom filter BF and a plurality of first randomized data FRS1 to FRSn obtained by randomizing the bloom data B1 to Bn with the first randomization array FRA as well as a one-to-one correspondence relationship between the bloom data B1 to Bn and the first randomized data FRS1 to FRSn. Accordingly, the transmission apparatus 3 may obtain the current bloom datum Bp by comparing the current first randomized datum FRSp with the first randomized data FRS1 to FRSn directly according to the randomization mapping table of the first randomization array FRA.

Finally, the transmission apparatus 3 obtains the current original datum Sp corresponding to the current bloom datum Bp according to the input/output table of the bloom filter. In this way, the transmission apparatus 3 can make a response immediately in response to the information indicated by the current original datum Sp, e.g., inform the user via a screen or a loud speaker, or automatically control the action of the vehicle. As can be known from the above descriptions, the present invention generates output data for input data in a limited input space or relatively fixed in one-to-one correspondence, and achieves the purpose of securely processing the original data through two stages of data randomization procedures (a fixed randomization array is adopted in the first stage, while a dynamically selected randomization array is adopted in the second stage) so that the data transmitted cannot be decoded by eavesdroppers using regularity. Moreover, the apparatus at the transmitting end and the apparatus at the receiving end exchange agreed parameter data (i.e., the bloom filter, the first randomization array FRA, the second randomization arrays SRA1 to SRAm, and identifiers ID1 to IDm of each of the second randomization arrays SRA1 to SRAm) in advance so that the apparatus at the receiving end can completely recover the received date into the original data.

Figure 3A:
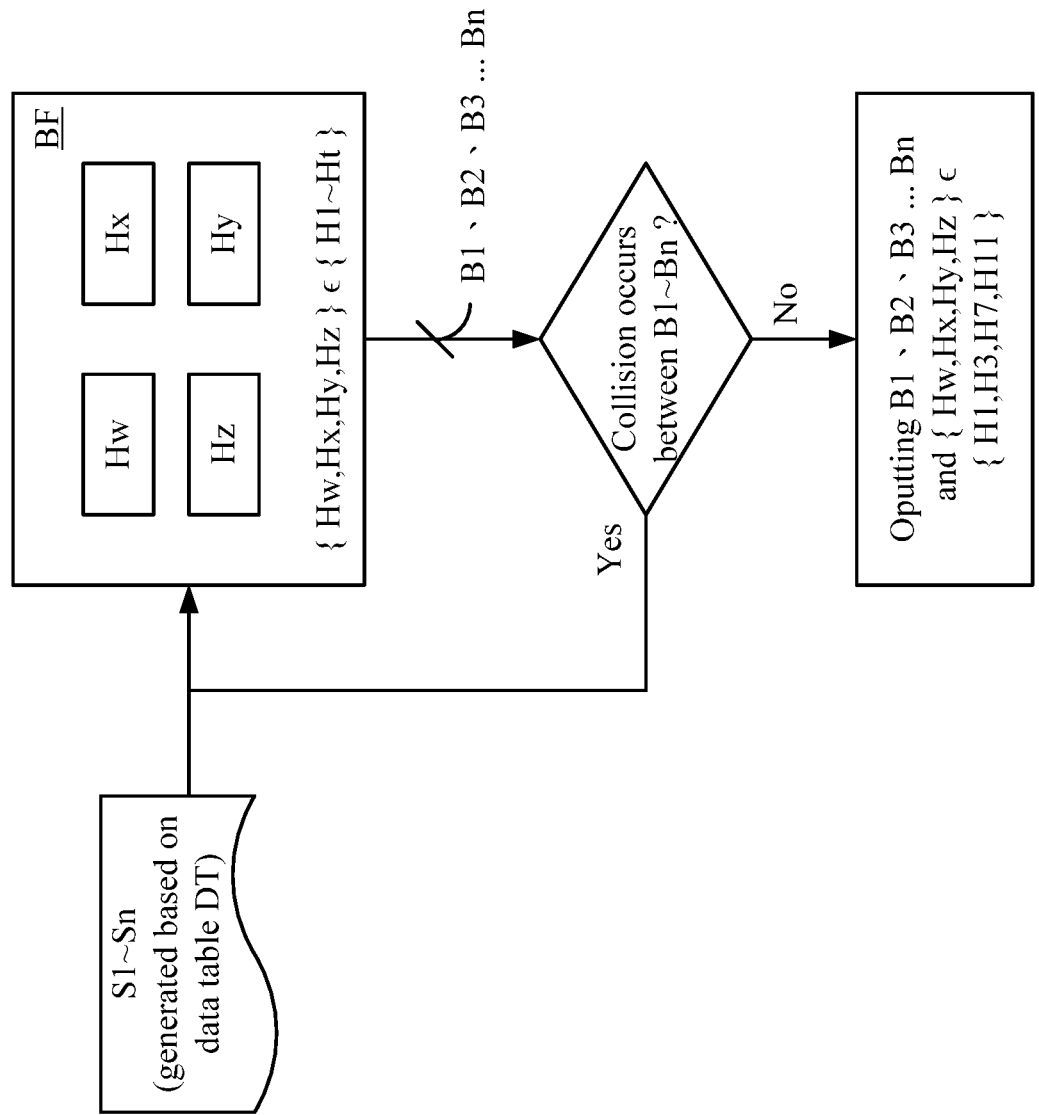
FIG. 3A is a schematic view illustrating a loop training of a bloom filter according to the present invention.
Figure 3B:
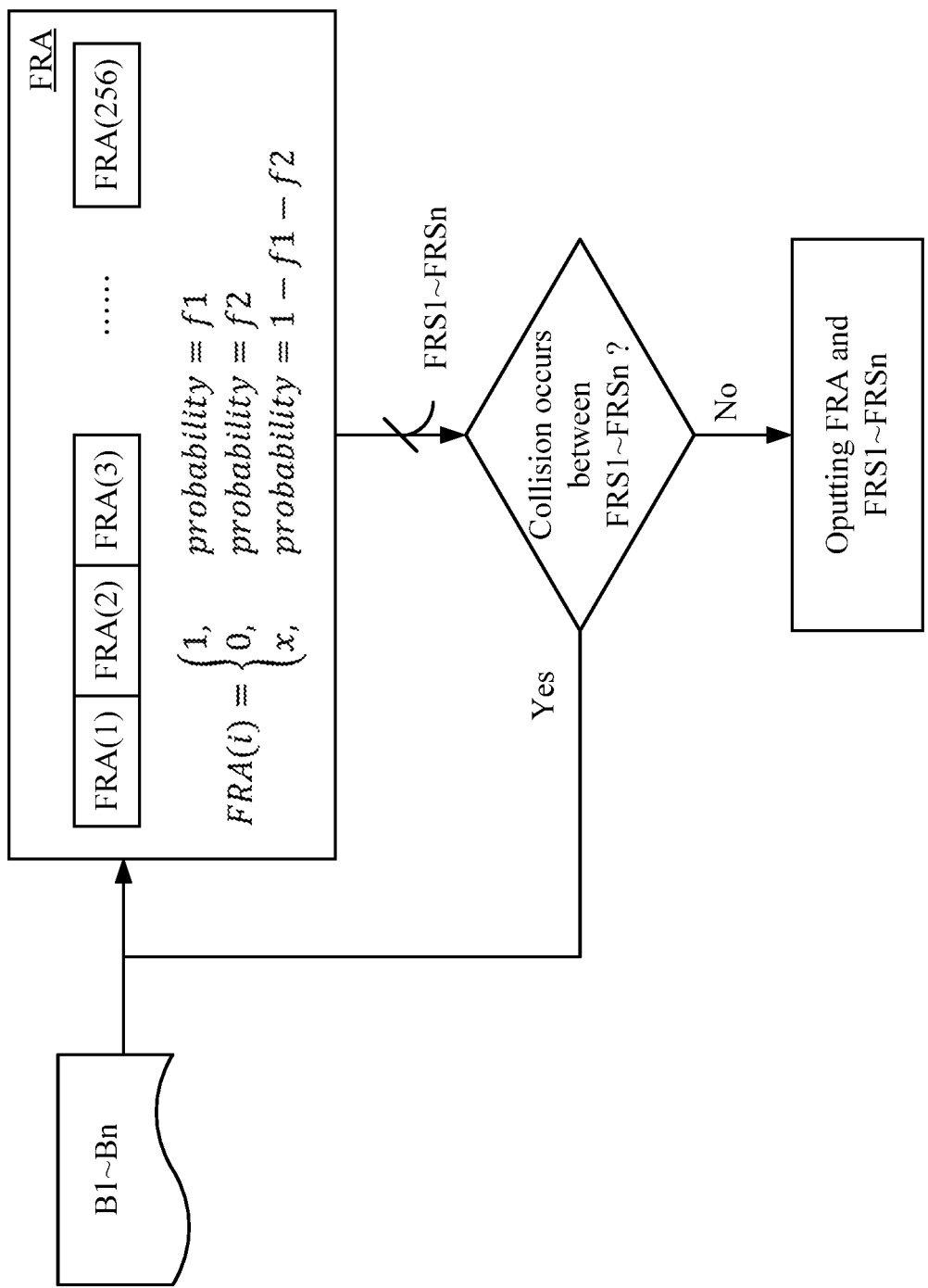
FIG. 3B is a schematic view illustrating a loop training of a first randomization array according to the present invention.
Figure 3C:
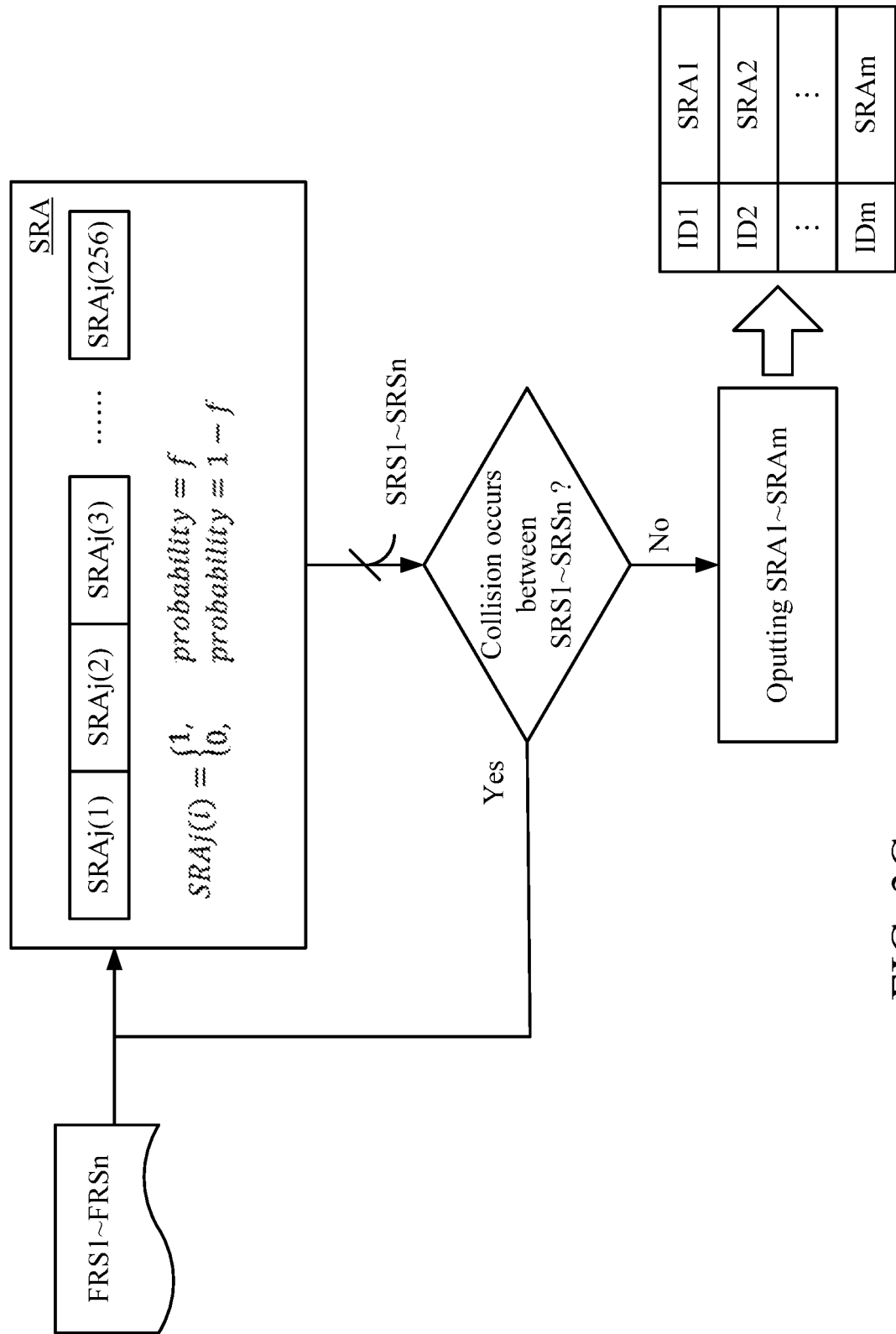
FIG. 3C is a schematic view illustrating a loop training of a plurality of second randomization arrays according to the present invention.

A second embodiment of the present invention is as shown in FIG. 3A to FIG. 3C. FIG. 3A is a schematic view illustrating a loop training of the bloom filter BF according to the present invention. FIG. 3B is a schematic view illustrating a loop training of the first randomization array FRA according to the present invention. FIG. 3C is a schematic view illustrating a loop training of the second randomization arrays SRA1 to SRAm according to the present invention. It shall be appreciated that, those loop trainings may be executed in advance by a computer having a high computing capability (e.g., a server at the backhaul network of a mobile network provider), and then the results thereof are provided to the transmission apparatus 1 and the transmission apparatus 3. Alternatively, in case where the transmission apparatus 1 itself has the high computing capability, these loop trainings may be executed in initial set stages, and then the results thereof are provided to the transmission apparatus 3.

First, as shown in FIG. 3A, four independent hash functions Hw, Hx, Hy and Hz are chosen randomly from a plurality of independent hash functions H1 to Ht (e.g., 50 hash functions, i.e., t=50) ({Hw, Hx, Hy, Hz}∈{H1~Ht}) as the hash functions of the bloom filter BF, and the original data S1 to Sn are sequentially inputted into the bloom filter BF, thereby determining whether these currently chosen four independent hash functions Hw, Hx, Hy and Hz can make these different original data S1 to Sn inputted to the bloom filter BF have different bloom data B1 to Bn in one-to-one correspondence. Each of the bloom data B1 to Bn is a binary datum with 256 bits. If there are same data in the generated bloom data B1 to Bn, then it means that the currently chosen four independent hash functions Hw, Hx, Hy and Hz will cause data collision between the data outputted from the bloom filter BF. Therefore, four independent hash functions Hw, Hx, Hy and Hz need to be chosen randomly again as the hash functions of the bloom filter BF, and the original data S1 to Sn are again sequentially inputted into the bloom filter BF, thereby determining whether the four re-chosen independent hash functions Hw, Hx, Hy and Hz can make these different original data S1 to Sn inputted to the bloom filter BF have different bloom data B1 to Bn in one-to-one correspondence.

By such a loop training of determining whether collision occurs to re-choose four independent hash functions Hw, Hx, Hy and Hz randomly and inputting the original data S1 to Sn sequentially to the bloom filter BF, the present invention can obtain a set of four independent hash functions Hw, Hx, Hy and Hz (e.g., the hash functions Hw, Hx, Hy and Hz are hash functions H1, H3, H7 and H11) which make these different original data S1 to Sn inputted to the bloom filter BF have different bloom data B1 to Bn in one-to-one correspondence. In other words, the four independent hash functions H1, H3, H7 and H11 in the bloom filter BF of the present invention are chosen from t independent hash functions H1 to Ht through the aforesaid loop training by inputting the different original data S1 to Sn generated according to the data table DT as the input data of the bloom filter BF so as to make the different original data S1 to Sn inputted to the bloom filter BF have different bloom data B1 to Bn in one-to-one correspondence.

After the bloom data B1 to Bn are obtained by determining the four independent hash functions from the bloom filter BF through the loop training, the first randomization array FRA is further determined through a loop training in the present invention. As shown in FIG. 3B, the first randomization array FRA comprises a plurality of fields FRA(1) to FRA(256) which correspond to 256 bits of each of the bloom data B1 to Bn in one-to-one correspondence. A value of each of the fields FRA(i) indicates that the corresponding bit needs to be set to be 1 or 0 or keep unchanged, and the value of each of the fields FRA(i) is generated independently based on a probability function. The probability function makes the corresponding bit be set to be 1 with a probability of f1, be set to be 0 with a probability of f2 and be kept unchanged with a probability of 1-f1-f2. Therefore, the present invention determines, through the loop training, whether the currently generated first randomization array FRA can make the different bloom data B1 to Bn outputted from the bloom filter have a plurality of different first randomized data FRS1 to FRSn in one-to-one correspondence after being randomized by the first randomization array FRA respectively.

Similarly, if there are same data in the generated first randomized data FRS1 to FRSn, then it means that the currently generated first randomization array FRA will cause data collision between the first randomized data FRS1 to FRSn. Therefore, it is necessary to re-generate the first randomization array FRA or further adjust the probability f1 and f2 and randomize the bloom data B1 to Bn again based on the newly generated first randomization array FRA, thereby determining whether the bloom data B1 to Bn have different first randomized data FRS1 to FRSn in one-to-one correspondence after being randomized by the newly generated first randomization array FRA respectively.

By such a loop training of determining whether collision occurs to re-generate the first randomization array FRA and randomizing the bloom data B1 to Bn, the present invention can obtain a first randomization array FRA, which can make the different bloom data B1 to Bn outputted from the bloom filter have different first randomized data FRS1 to FRSn in one-to-one correspondence after being randomized by the first randomization array FRA respectively.

Finally, after the first randomized data FRS1 to FRSn are obtained by determining the first randomization array FRA, the present invention further determines a plurality of second randomization arrays SRA1 to SRAm (m is a positive integer, e.g., 10) through a loop training. As shown in FIG. 3C, each second randomization array SRAj (j=1~m) corresponds to an identifier IDj and comprises a plurality of fields SRAj(1) to SRAj(256), and the fields SRAj(1) to SRAj(256) correspond to 256 bits of the first randomized data FRS1 to FRSn in one-to-one correspondence. A value of each field SRAj(i) indicates whether the corresponding bit needs to be inverted, the value of each field SRAj(i) is generated independently based on a probability function. The probability function makes the corresponding bit be inverted with a probability of f and be kept unchanged with a probability of 1-f. Therefore, the present invention determines, through the loop training, whether the currently generated second randomized arrays SRAj can make the first randomized data FRS1 to FRSn have a plurality of different second randomized data SRS1 to SRSn in one-to-one correspondence after being randomized by the second randomization array SRAj respectively.

Similarly, if there are same data in the generated second randomized data SRS1 to SRSn, then it means that the currently generated second randomization array SRAj will cause data collision between the second randomized data SRS1 to SRSn. Therefore, it is necessary to re-generate the second randomization array SRAj or further adjust the probability f to randomize the first randomized data FRS1 to FRSn again based on the newly generated second randomization array SRAj, thereby determining whether the first randomized data FRS1 to FRSn have different second randomized data SRS1 to SRSn in one-to-one correspondence after being randomized by the newly generated second randomization array SRAj respectively.

By such a loop training of determining whether collision occurs to re-generate the second randomization array SRAj and randomizing the first randomized data FRS1 to FRSn, the present invention can obtain m second randomization array SRA1 to SRAm, each of which can make the first randomized data FRS1 to FRSn have different second randomized data SRS1 to SRSn in one-to-one correspondence after being randomized by the second randomization array SRA1 to SRAm respectively.

It shall be appreciated that, this embodiment is described by taking the bloom filter BF having four independent hash functions and generating binary data with 256 bits as an example. However, in other embodiments, the bloom filter BF having other numbers of independent hash functions and generating binary data with other numbers of bits may also be chosen based on requirements of practical system operations. Meanwhile, in response to the binary data with different numbers of bits generated by the bloom filter BF, the numbers of the fields of the first randomization array FRA and the second randomization arrays SRA1 to SRAm also change accordingly. How to train the bloom filter BF having other numbers of independent hash values and how to determine the first randomization array FRA and the second randomization arrays SRA1 to SRAm through the loop training shall be appreciated by those of ordinary skill in the art based on the above descriptions, and thus will not be further described herein.

Figure 4:
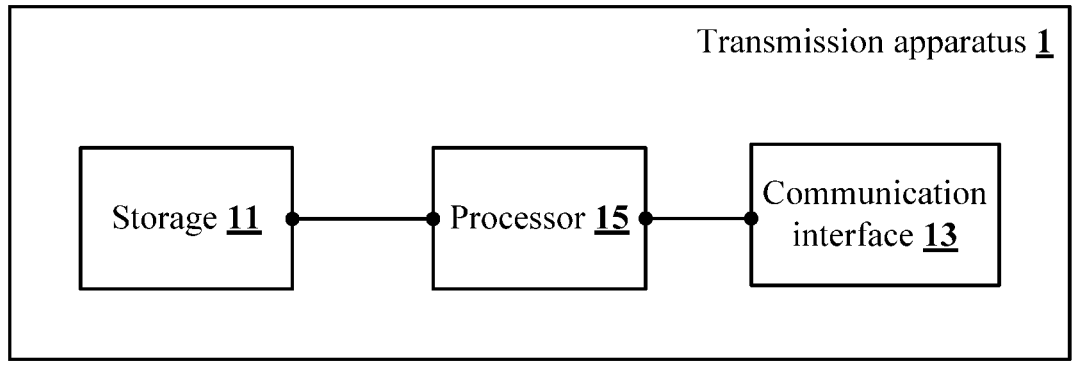
FIG. 4 is a schematic view of the transmission apparatus 1 according to the present invention.

A third embodiment of the present invention is as shown in FIG. 4, which is a schematic view of a transmission apparatus 1 according to the present invention. The transmission apparatus 1 comprises a storage 11, a communication interface 13 and a processor 15. The communication interface 13 may be a wired communication interface or a wireless communication interface. The processor 15 is electrically connected to the storage 11 and the communication interface 13. It shall be appreciated that, other elements (e.g., elements relatively unrelated to the present invention such as antenna modules, power supply modules or the like) of the transmission apparatus 1 are omitted from depiction in the attached drawings for simplification of the description.

The storage 11 is configured to store the data table DT, the bloom filter BF, the first randomization array FRA, the second randomization arrays SRA1 to SRAm and identifiers ID1 to IDm of each of the second randomization arrays SRA1 to SRAm. As described previously, the bloom filter BF has a plurality of independent hash functions (e.g., four independent hash values H1, H3, H7 and H11). The processor 15 generates a current original datum Sp according to the data table DT. Next, the processor 15 inputs the current original datum Sp to the bloom filter BF as a current input datum of the bloom filter BF to output the current bloom datum Bp.

Thereafter, the processor 15 randomizes the current bloom datum Bp by setting a plurality of first partial bits of the current bloom datum Bp to be 1, setting a plurality of second partial bits of the current bloom datum Bp to be 0 and keeping a plurality of remaining partial bits of the current bloom datum Bp unchanged according to the first randomization array FRA to generate a current first randomized datum FRSp. Thereafter, the processor 15 randomly chooses one of the second randomization arrays SRA1 to SRAm (e.g., SRA9) and randomizes the current first randomized datum FRSp by inverting a plurality of partial bits in the current first randomized datum FRSp according to the chosen second randomization array SRA9 to generate the current second randomized datum SRSp.

Finally, the processor 15 transmits a data signal 102 to the transmission apparatus 3 via the communication interface 13. As described previously, the data signal 102 carries the current second randomized datum SRSp and the identification datum IDD. The identification datum IDD corresponds to the identifier ID9 of the chosen second randomization array SRA9. Moreover, the processor 15 may record the identifier ID9 of the chosen second randomization array SRA9 in the identification datum IDD in a plaintext form, or record a hash value, generated by calculating the identifier ID9 of the chosen second randomization array SRA9 with a hash function, in the identification datum IDD.

Figure 5:
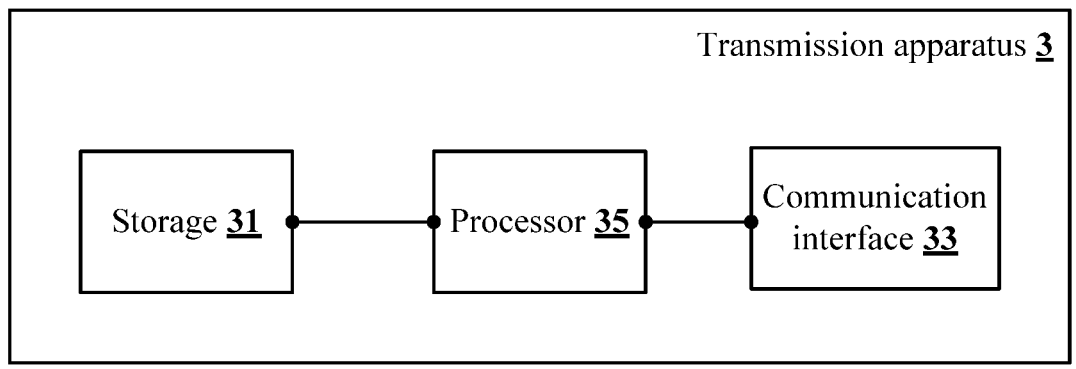
FIG. 5 is a schematic view of the transmission apparatus 3 according to the present invention.

A fourth embodiment of the present invention is as shown in FIG. 5, which is a schematic view of a transmission apparatus 3 according to the present invention. The transmission apparatus 3 comprises a storage 31, a communication interface 33 and a processor 35. The communication interface 33 may be a wired communication interface or a wireless communication interface. The processor 35 is electrically connected to the storage 31 and the communication interface 33. It shall be appreciated that, other elements (e.g., elements relatively unrelated to the present invention such as antenna modules, power supply modules or the like) of the transmission apparatus 3 are omitted from depiction in the attached drawings for simplification of the description.

The storage 31 is configured to store the data table DT, an input/output table of the bloom filter BF, the first randomization array FRA, the second randomization arrays SRA1 to SRAm, and identifiers ID1 to IDm of each of the second randomization arrays SRA1 to SRAm. The input/output table records the original data S1 to Sn generated based on the data table DT, the bloom data B1 to Bn outputted by the bloom filter BF, and a one-to-one correspondence relationship between the original data S1 to Sn and the bloom data B1 to Bn. The input/output table may be generated by the processor 35 itself by inputting the original data S1 to Sn to the bloom filter BF, or may be obtained from the transmission apparatus 1 or a remote server, but it is not limited thereto. The processor 35 receives the data signal 102 from the transmission apparatus 1 via the communication interface 33. The data signal 102 carries the current second randomized datum SRSp and the identification datum IDD.

Thereafter, the processor 35 obtains the identifier of one of the second randomization arrays SRA1 to SRAm (e.g., the identifier ID9 of the second randomization array SRA9) according to the identification datum IDD. Next, the processor 35 inverts a plurality of partial bits of the current second randomized datum SRSp according to the second randomization array SRA9 corresponding to the obtained identifier ID9 to recover the current first randomized datum FRSp. Thereafter, the processor 35 compares the current first randomized datum FRSp with the bloom data B1 to Bn according to the first randomization array FRA to obtain the current bloom datum Bp.

In an implementation, the processor 35 may compare the current first randomized datum FRSp with the bloom data B1 to Bn according to the bits corresponding to the field FRA(i) having a value of x (i.e., bits unchanged by the first randomization array FRA) in the first randomization array FRA to obtain a plurality of current candidate bloom data. Next, the processor 35 may randomize the current candidate bloom data with the first randomization array FRA to obtain a plurality of current candidate first randomized data. Accordingly, the processor 35 may obtain the current bloom datum Bp from the current candidate bloom data by comparing the current first randomized datum FRSp with the current candidate first randomized data.

In another implementation, the processor 35 may store a randomization mapping table of the first randomization array FRA. The randomization mapping table records the bloom data B1 to Bn outputted from the bloom filter BF and the first randomized data FRS1 to FRSn obtained by randomizing the bloom data B1 to Bn with the first randomization array FRA as well as a one-to-one correspondence relationship between the bloom data B1 to Bn and the first randomized data FRS1 to FRSn. Similarly, the randomization mapping table may be generated by the processor 35 itself by randomizing the bloom data B1 to Bn with the first randomization array FRA, or may be obtained from the transmission apparatus 1 or a remote server, but it is not limited thereto. Accordingly, the processor 35 may compare the current first randomized datum FRSp with the first randomized data FRS1 to FRSn directly according to the randomization mapping table of the first randomization array FRA to obtain the current bloom datum Bp.

After obtaining the current bloom datum Bp, the processor 35 obtains the current original datum Sp corresponding to the current bloom datum Bp according to the input/output table of the bloom filter. In this way, processor 35 may make a response immediately in response to the information indicated by the current original datum Sp, e.g., enables a screen or a loud speaker to inform the user, or automatically control the action of the vehicle.

Figure 6:
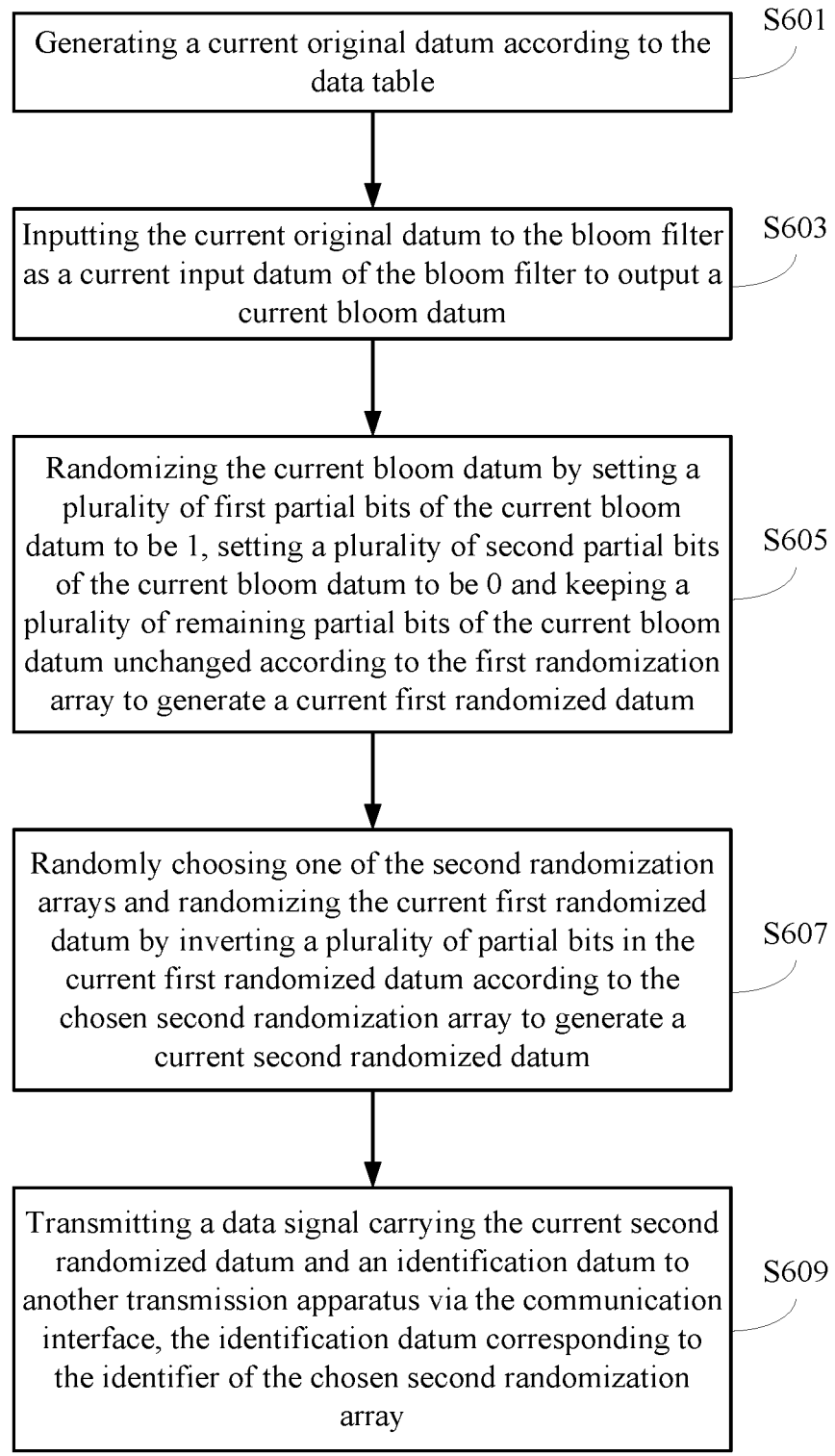
FIG. 6 is a flowchart diagram of a transmission data protection method according to the present invention.

A fifth embodiment of the present invention is as shown in FIG. 6, which is a flowchart diagram of a transmission data protection method according to the present invention. The transmission data protection method is adapted for a transmission apparatus, and the transmission apparatus comprises a storage, a communication interface and a processor. The storage stores a data table, a bloom filter, a first randomization array, a plurality of second randomization arrays and an identifier of each of the second randomization arrays. The bloom filter has a plurality of independent hash functions. The transmission data protection method is executed by the processor.

First, in step S601, a current original datum is generated according to the data table. Next, in step S603, the current original datum is inputted to the bloom filter as a current input datum of the bloom filter to output a current bloom datum. In step S605, the current bloom datum is randomized by setting a plurality of first partial bits of the current bloom datum to be 1, setting a plurality of second partial bits of the current bloom datum to be 0 and keeping a plurality of remaining partial bits of the current bloom datum unchanged according to the first randomization array to generate a current first randomized datum. Thereafter, in step S607, one of the second randomization arrays is randomly chosen and the current first randomized datum is randomized by inverting a plurality of partial bits in the current first randomized datum according to the chosen second randomization array to generate a current second randomized datum. Finally, in step S609, a data signal carrying the current second randomized datum and an identification datum is transmitted to another transmission apparatus via the communication interface, the identification datum corresponding to the identifier of the chosen second randomization array.

In other embodiments, the bloom filter has four independent hash functions to generate the current bloom datum with 256 bits. The four independent hash functions may be chosen from t independent hash functions through a loop training (e.g., the loop training of the bloom filter as shown in FIG. 3A) by inputting a plurality of different original data generated according to the data table as a plurality of input data of the bloom filter so as to make the different original data inputted to the bloom filter have a plurality of different bloom data in one-to-one correspondence.

In still other embodiments, the first randomization array comprises a plurality of fields which correspond to a plurality of bits of the current bloom data in one-to-one correspondence, and a value of each of the fields indicates that the corresponding bit of the current bloom data needs to be set to be 1 or 0 or keep unchanged. The value of each of the fields is generated independently based on a probability function. The probability function makes the corresponding bit be set to be 1 with a probability of f1, be set to be 0 with a probability of f2 and be kept unchanged with a probability of 1-f1-f2. The first randomization array is determined through a loop training (e.g., the loop training for the first randomized array as shown in FIG. 3B) so as to make a plurality of different bloom data outputted from the bloom filter have a plurality of different first randomized data in one-to-one correspondence after being randomized by the first randomization array respectively.

Additionally, in other embodiments, each of the second randomization arrays comprises a plurality of fields that correspond to a plurality of bits of the current first randomized data in one-to-one correspondence, and a value of each of the fields indicates whether the corresponding bit of the current first randomized data needs to be inverted. The value of each of the fields is generated independently based on a probability function, and the probability function makes the corresponding bit be inverted with a probability of f and be kept unchanged with a probability of 1-f. Each of the second randomized arrays is determined through a loop training (e.g., the loop training for the second randomized array as shown in FIG. 3C) so as to make a plurality of different first randomized data have a plurality of different second randomized data in one-to-one correspondence after being randomized by any of the second randomization arrays respectively.

In an embodiment, the identification data records the identifier of the chosen second randomization array in a plaintext form, or the identification data is generated by calculating the identifier of the chosen second randomization array with a hash function.

In addition to the aforesaid steps, the transmission data protection method of this embodiment can also execute all the operations and functions set forth in the aforesaid embodiments. How this embodiment executes these operations and functions will be readily appreciated by those of ordinary skill in the art based on the explanation of the aforesaid embodiments, and thus will not be further described herein.

According to the above descriptions, the transmission data protection mechanism of the present invention achieves secure processing on the original data through operation minimization and enables the apparatus at the receiving end to completely recover the received data into the original data. In this way, the transmission data protection mechanism of the present invention can effectively reduce the time required to perform secure processing on the data to be transmitted and the time required to recover the data received so that the timeliness information can be obtained by the apparatus at the receiving end timely. Additionally, the transmission data protection mechanism of the present invention may also be applied to Internet of Things (IoT) data transmission to solve the problem that the current IoT data transmission usually adopts the plaintext form for recording and lacks of privacy protection, and meanwhile solve the problem that the IoT apparatus usually lacks of high-performance processors for performing complicated data encryption and decryption.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. A transmission apparatus, comprising:
   a storage, being configured to store a data table, a bloom filter, a first randomization array, a plurality of second randomization arrays and an identifier of each of the second randomization arrays, the bloom filter having a plurality of independent hash functions;
   a communication interface; and
   a processor electrically connected to the storage and the communication interface, being configured to execute the following operations:
   generating a current original datum according to the data table;
   inputting the current original datum to the bloom filter as a current input datum of the bloom filter to output a current bloom datum;
   randomizing the current bloom datum by setting a plurality of first partial bits of the current bloom datum to be 1, setting a plurality of second partial bits of the current bloom datum to be 0 and keeping a plurality of remaining partial bits of the current bloom datum unchanged according to the first randomization array to generate a current first randomized datum;
   randomly choosing one of the second randomization arrays and randomize the current first randomized datum by inverting a plurality of partial bits in the current first randomized datum according to the chosen second randomization array to generate a current second randomized datum; and
   transmitting a data signal carrying the current second randomized datum and an identification datum to another transmission apparatus via the communication interface, the identification datum corresponding to the identifier of the chosen second randomization array.

2. The transmission apparatus of claim 1, wherein the bloom filter has four independent hash functions to generate the current bloom datum with 256 bits.

3. The transmission apparatus of claim 2, wherein the four independent hash functions are chosen from t independent hash functions through a loop training by inputting a plurality of different original data generated according to the data table as a plurality of input data of the bloom filter so as to make the different original data inputted to the bloom filter have a plurality of different bloom data in one-to-one correspondence.

4. The transmission apparatus of claim 1, wherein the first randomization array comprises a plurality of fields which correspond to a plurality of bits of the current bloom data in one-to-one correspondence, a value of each of the fields indicates that the corresponding bit of the current bloom data needs to be set to be 1 or 0 or keep unchanged, the value of each of the fields is generated independently based on a probability function, the probability function makes the corresponding bit be set to be 1 with a probability of f1, be set to be 0 with a probability of f2 and be kept unchanged with a probability of 1-f1-f2, and the first randomization array is determined through a loop training so as to make a plurality of different bloom data outputted from the bloom filter have a plurality of different first randomized data in one-to-one correspondence after being randomized by the first randomization array respectively.

5. The transmission apparatus of claim 1, wherein each of the second randomization arrays comprises a plurality of fields that correspond to a plurality of bits of the current first randomized data in one-to-one correspondence, a value of each of the fields indicates whether the corresponding bit of the current first randomized data needs to be inverted, the value of each of the fields is generated independently based on a probability function, and the probability function makes the corresponding bit be inverted with a probability of f and be kept unchanged with a probability of 1-f, and each of the second randomized arrays is determined through a loop training so as to make a plurality of different first randomized data have a plurality of different second randomized data in one-to-one correspondence after being randomized by any of the second randomization arrays respectively.

6. The transmission apparatus of claim 1, wherein the identification data records the identifier of the chosen second randomization array in a plaintext form.

7. The transmission apparatus of claim 1, wherein the identification data is generated by calculating the identifier of the chosen second randomization array with a hash function.

8. A transmission data protection method for a transmission apparatus, the transmission apparatus comprises a storage, a communication interface and a processor, the storage being configured to store a data table, a bloom filter, a first randomization array, a plurality of second randomization arrays and an identifier of each of the second randomization arrays, the bloom filter having a plurality of independent hash functions, and the transmission data protection method being executed by the processor and comprising:
   generating a current original datum according to the data table;
   inputting the current original datum to the bloom filter as a current input datum of the bloom filter to output a current bloom datum;
   randomizing the current bloom datum by setting a plurality of first partial bits of the current bloom datum to be 1, setting a plurality of second partial bits of the current bloom datum to be 0 and keeping a plurality of remaining partial bits of the current bloom datum unchanged according to the first randomization array to generate a current first randomized datum;
   randomly choosing one of the second randomization arrays and randomizing the current first randomized datum by inverting a plurality of partial bits in the current first randomized datum according to the chosen second randomization array to generate a current second randomized datum; and
   transmitting a data signal carrying the current second randomized datum and an identification datum to another transmission apparatus via the communication interface, the identification datum corresponding to the identifier of the chosen second randomization array.

9. The transmission data protection method of claim 8, wherein the bloom filter has four independent hash functions to generate the current bloom datum with 256 bits.

10. The transmission data protection method of claim 9, wherein the four independent hash functions are chosen from t independent hash functions through a loop training by inputting a plurality of different original data generated according to the data table as a plurality of input data of the bloom filter so as to make the different original data inputted to the bloom filter have a plurality of different bloom data in one-to-one correspondence.

11. The transmission data protection method of claim 8, wherein the first randomization array comprises a plurality of fields which correspond to a plurality of bits of the current bloom data in one-to-one correspondence, a value of each of the fields indicates that the corresponding bit of the current bloom data needs to be set to be 1 or 0 or keep unchanged, the value of each of the fields is generated independently based on a probability function, the probability function makes the corresponding bit be set to be 1 with a probability of f1, be set to be 0 with a probability of f2 and be kept unchanged with a probability of 1-f1-f2, and the first randomization array is determined through a loop training so as to make a plurality of different bloom data outputted from the bloom filter have a plurality of different first randomized data in one-to-one correspondence after being randomized by the first randomization array respectively.

12. The transmission data protection method of claim 8, wherein each of the second randomization arrays comprises a plurality of fields that correspond to a plurality of bits of the current first randomized data in one-to-one correspondence, a value of each of the fields indicates whether the corresponding bit of the current first randomized data needs to be inverted, the value of each of the fields is generated independently based on a probability function, and the probability function makes the corresponding bit be inverted with a probability of f and be kept unchanged with a probability of 1-f, and each of the second randomized arrays is determined through a loop training so as to make a plurality of different first randomized data have a plurality of different second randomized data in one-to-one correspondence after being randomized by any of the second randomization arrays respectively.

13. The transmission data protection method of claim 8, wherein the identification data records the identifier of the chosen second randomization array in a plaintext form.

14. The transmission data protection method of claim 8, wherein the identification data is generated by calculating the identifier of the chosen second randomization array with a hash function.

15. A transmission apparatus, comprising:
 a storage, being configured to store a data table, an input/output table of a bloom filter, a first randomization array, a plurality of second randomization arrays and an identifier of each of the second randomization arrays, and the input/output table recording a plurality of original data generated based on the data table, a plurality of bloom data outputted by the bloom filter, and a one-to-one correspondence relationship between the original data and the bloom data;
 a communication interface; and
 a processor electrically connected to the storage and the communication interface, being configured to execute the following operations:
  receiving a data signal from another transmission apparatus via the communication interface, the data signal carrying a current second randomized datum and an identification datum;
  obtaining the identifier of one of the second randomization arrays according to the identification datum;
  inverting a plurality of partial bits of the current second randomized datum according to the second randomization array corresponding to the obtained identifier to recover a current first randomized datum;
  comparing the current first randomized datum with the bloom data according to the first randomization array to obtain a current bloom datum, wherein the current first randomized datum is generated through randomizing the current bloom data by setting a plurality of first partial bits of the current bloom data to be 1, a plurality of second partial bits of the current bloom data to be 0 and keeping a plurality of remaining partial bits of the current bloom data unchanged according to the first randomization array; and
  obtaining the current original datum corresponding to the current bloom datum according to the input/output table of the bloom filter.

16. The transmission apparatus of claim 15, wherein when the processor compares the current first randomized datum with the bloom data according to the first randomization array to obtain a plurality of current candidate bloom data, the processor further randomizes the current candidate bloom data with the first randomization array to generate a plurality of current candidate first randomized data, and the processor further compares the current first randomized datum with the current candidate first randomized data to obtain the current bloom datum from the current candidate bloom data.

17. The transmission apparatus of claim 15, wherein the storage further stores a randomization mapping table of the first randomization array, the randomization mapping table records the bloom data outputted from the bloom filter and a plurality of first randomized data obtained by randomizing the bloom data with the first randomization array, and a one-to-one correspondence relationship between the bloom data and the first randomized data, and the processor compares the current first randomized datum with the first randomized data according to the randomization mapping table of the first randomization array to obtain the current bloom datum.

* * * * *